(12) United States Patent
Ishikawa (10) Patent No.: US 6,323,902 B1
(45) Date of Patent: Nov. 27, 2001

(54) INFORMATION DETECTING APPARATUS MOUNTABLE ON INFORMATION PROCESSING APPARATUS AND INFORMATION PROCESSING SYSTEM WITH THE SAME

(75) Inventor: Kenichi Ishikawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/980,453

(22) Filed: Nov. 28, 1997

(30) Foreign Application Priority Data

Apr. 30, 1997 (JP) .................................................. 9-112830

(51) Int. Cl.⁷ .......................... H04N 5/225; H04N 5/232
(52) U.S. Cl. ...................... 348/373; 348/14.05; 348/211; 348/552; D14/125; D14/317; D16/202; D16/208; 248/918; 345/330; 358/909.1; 396/428; 396/429
(58) Field of Search .................................. D14/125, 129, D14/130, 315, 316, 317; D16/200, 202, 208; 248/296.1, 297.21, 917, 918, 919; 345/326, 330, 331; 396/419, 428, 429; 348/14.01, 14.03, 14.08, 14.16, 207, 211, 373, 375, 552; 358/906, 909.1; 361/679, 681, 683

(56) References Cited

U.S. PATENT DOCUMENTS

| | | | |
|---|---|---|---|
| D. 373,355 | * | 9/1996 | Huang et al. ....................... D16/202 |
| D. 394,668 | * | 5/1998 | Iino ..................................... D16/202 |
| D. 409,583 | * | 5/1999 | Nishida et al. ..................... D14/317 |
| 5,412,417 | * | 5/1995 | Tozuka ............................. 348/14.01 |
| 5,719,799 | * | 2/1998 | Isashi ................................... 348/552 |
| 5,734,414 | * | 3/1998 | Nishimura et al. .................. 348/373 |
| 5,801,919 | * | 9/1998 | Griencewic ......................... 348/552 |
| 5,808,672 | * | 9/1998 | Wakabayashi et al. ............. 348/552 |
| 5,921,523 | * | 7/1999 | South et al. ......................... 248/918 |
| 6,118,653 | * | 9/2000 | Kim ..................................... 361/683 |

FOREIGN PATENT DOCUMENTS

| | | | |
|---|---|---|---|
| 6-70314 | * | 3/1994 | (JP) ............................... H04N/5/225 |
| 7-287623 | | 10/1995 | (JP) ................................... G06F/1/16 |
| 8-95670 | | 4/1996 | (JP) ................................... G06F/1/16 |
| 8-211978 | | 8/1996 | (JP) ................................... G06F/3/00 |

* cited by examiner

*Primary Examiner*—Wendy R. Garber
*Assistant Examiner*—Ngoc-Yen Vu
(74) *Attorney, Agent, or Firm*—Finnegan, Henderson, Farabow, Garrett, & Dunner, L.L.P.

(57) ABSTRACT

A base portion of a camera is mounted on a side wall of a display unit of a personal computer by a mounting mechanism. The base portion is coupled with a first movable portion rotatable around a first rotation axis that extends perpendicular to the side wall. The first movable portion is coupled with a second movable portion rotatable around a second rotation axis that extends parallel to the side wall. The second movable portion is provided with an image pickup portion for picking up an image of a subject.

6 Claims, 6 Drawing Sheets

INFORMATION DETECTING APPARATUS MOUNTABLE ON INFORMATION PROCESSING APPARATUS AND INFORMATION PROCESSING SYSTEM WITH THE SAME

BACKGROUND OF THE INVENTION

The present invention relates to an information detecting apparatus attached to an information processing apparatus, such as a personal computer, word processor, portable information terminal, etc., and adapted to receive and deliver directional information, such as images, infrared rays, radio waves, etc., to the information processing apparatus, and an information processing system provided with the same.

Modern information detecting apparatuses of this type include, for example, a computer camera that is mounted on a personal computer and used to detect image information. The camera is attached to a side face of a display of the computer by means of clips or the like.

The computer camera is provided with a position adjustment mechanism for directing its image pickup portion toward a subject. The position adjustment mechanism may be formed of, for example, a tilting mechanism for rocking the image pickup portion of the camera back and forth or a panning mechanism for rocking the image pickup portion from side to side.

Generally-known cameras to be mounted on the display of a notebook-type personal computer are provided with a tilting or panning mechanism or an image pickup portion that is attached to a panning mechanism on the side of the computer by means of a tilting mechanism.

According to the conventional computer cameras that are furnished with only one of the adjustment mechanisms, tilting or panning, however, the direction of the image pickup portion can be adjusted only within a limited range, and the personal computer body and the display must be subjected to angle adjustment in order to project the subject accurately. Thus, adjusting operation is troublesome.

According to the cameras having the image pickup portion that is attached to the panning mechanism on the body side by means of the tilting mechanism, on the other hand, the adjustment range can be made wider than that for the cameras with only one of the adjustment mechanisms. Depending on the way of adjustment, in some cases, however, a part of the camera may run against the computer or overlap the screen of the display, thereby lowering the visibility of the display.

BRIEF SUMMARY OF THE INVENTION

The present invention has been contrived in consideration of these circumstances, and its object is to provide an information detecting apparatus, which ensures wide-range angle adjustment and can be securely prevented from interfering with an information processing apparatus, and an information processing system provided with the same.

In order to achieve the above object, an information detecting apparatus according to the present invention comprises a base portion, mounting means for mounting the base portion on an information processing apparatus, a first movable portion attached to the base portion so as to be rotatable around a first rotation axis perpendicular to an imaginary reference plane in contact with an optional portion of the outer surface of the information processing apparatus, with the base portion mounted on the information processing apparatus, and a second movable portion attached to the first movable portion so as to be rotatable around a second rotation axis substantially parallel to the imaginary reference plane and supporting information detecting means for detecting directional information.

The second movable portion has a size such that the distance between the second rotation axis and the outermost portion of the outer surface of the second movable portion with respect to the second rotation axis is shorter than the distance between the second rotation axis and the imaginary reference plane.

An alternative information detecting apparatus according to the invention comprises a base portion, a first movable portion attached to the base portion so as to be rotatable around a first rotation axis, a second movable portion attached to the first movable portion so as to be rotatable around a second rotation axis perpendicular to the first rotation axis and supporting information detecting means for detecting directional information, and mounting means provided on the base portion for mounting the base portion on an information processing apparatus in a manner such that the first and second rotation axes extend at right angles and substantially parallel, respectively, to an optional portion of the outer surface of the information processing apparatus.

An information processing system according to the invention comprises an information processing apparatus including a substantially rectangular display unit, and an information detecting apparatus removably attached to the information processing apparatus. The information detecting apparatus includes a base portion, mounting means for mounting the base portion on the display unit, a first movable portion attached to the base portion so as to be rotatable around a first rotation axis perpendicular to an optional side face of the display unit, with the base portion mounted on the display unit, and a second movable portion attached to the first movable portion so as to be rotatable around a second rotation axis substantially parallel to the optional side face and supporting information detecting means for detecting directional information.

The second movable portion has a size such that the distance between the second rotation axis and the outermost portion of the outer surface of the second movable portion with respect to the second rotation axis is shorter than the distance between the second rotation axis and the optional side face.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 7C show an information processing system including a camera and a personal computer according to an embodiment of the present invention, in which:

DETAILED DESCRIPTION OF THE INVENTION

A notebook-type personal computer according to an embodiment of the present invention, which is provided with a camera attachable to a display unit, will be described in detail with reference to the accompanying drawings.

Figure 1:
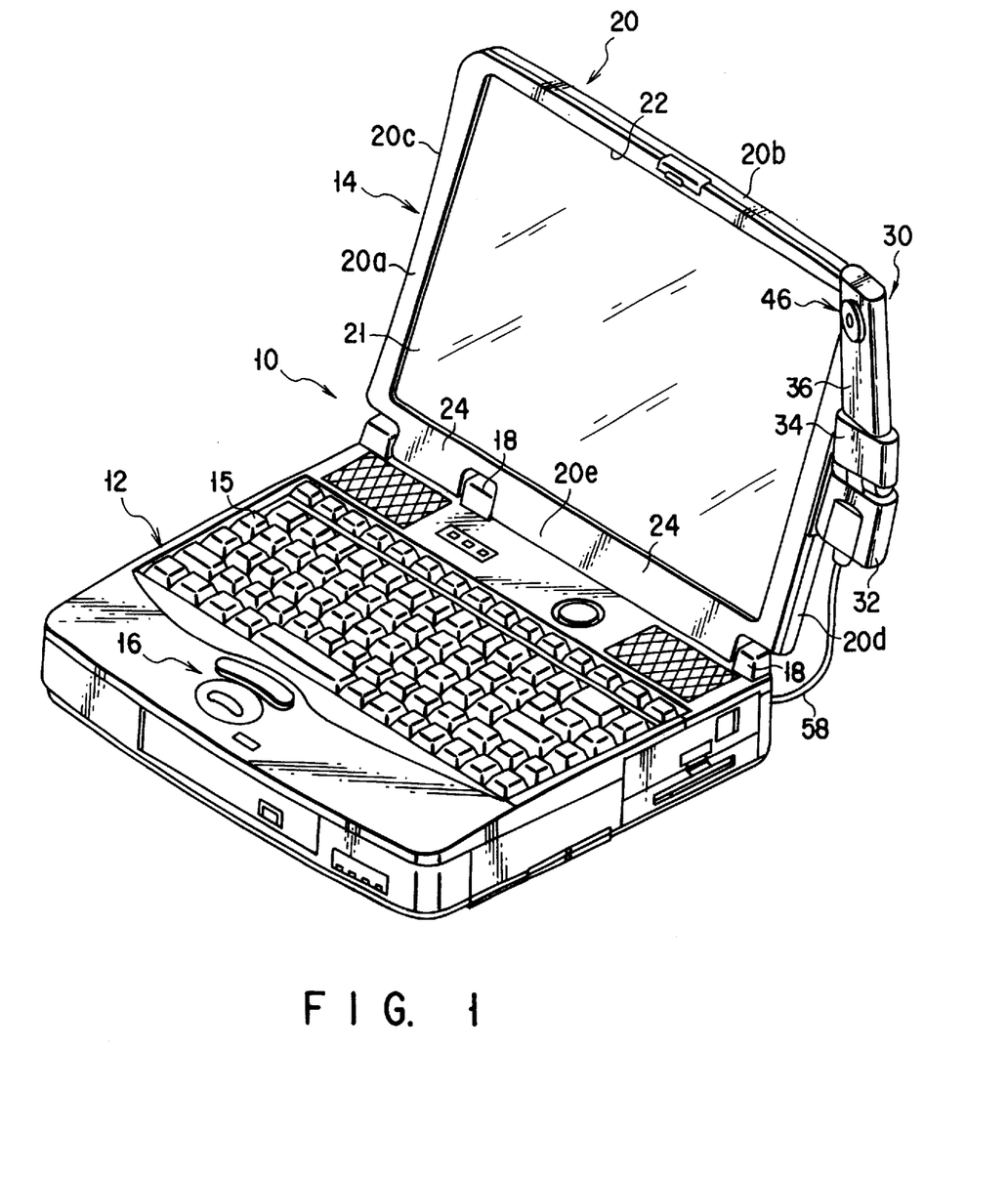
FIG. 1 is a perspective view showing the information processing apparatus.

As shown in FIG. 1, a personal computer 10, which functions both as an information processing apparatus and a personal electronic apparatus, comprises a rectangular apparatus body 12 and a display unit 14 swingably supported on the apparatus body.

A keyboard 15, click switch 16, etc. are provided on the top surface of the apparatus body 12, and a hard disk drive, optical disk drive, circuit board (not shown), etc. are arranged in the apparatus body. Further, a plurality of projections 18 are provided on the rear end portion of the top surface of the apparatus body 12.

The display unit 14 comprises a display housing 20, in the form of a flat rectangular box corresponding to the apparatus body 12 in shape, and a liquid crystal display panel 21. The display housing 20 includes a front wall 20a having a rectangular aperture 22 therein and four side walls 20b, 20c, 20d and 20e. The side wall 20e on the rear end side is supported on the projections 18 of the apparatus body 12 by means of a hinge portion 24. Thus, the display unit 14 is swingable between a closed position in which it overlies the top surface of the apparatus body 12 and covers the keyboard 15 and an open position in which it allows the keyboard and the liquid crystal display panel 21 to be exposed.

On the other hand, a camera 30, which constitutes an information detecting apparatus, is removably mounted on the side wall 20d of the display unit 14. As shown in FIGS. 1 to 3B, the camera 30 is provided with a base portion 32 and first and second movable portions 34 and 36, which are formed by a resin in the form of a substantially rectangular box, respectively. These portions 32, 34 and 36 have the same width W, and are arranged in a straight line.

Figure 3A:
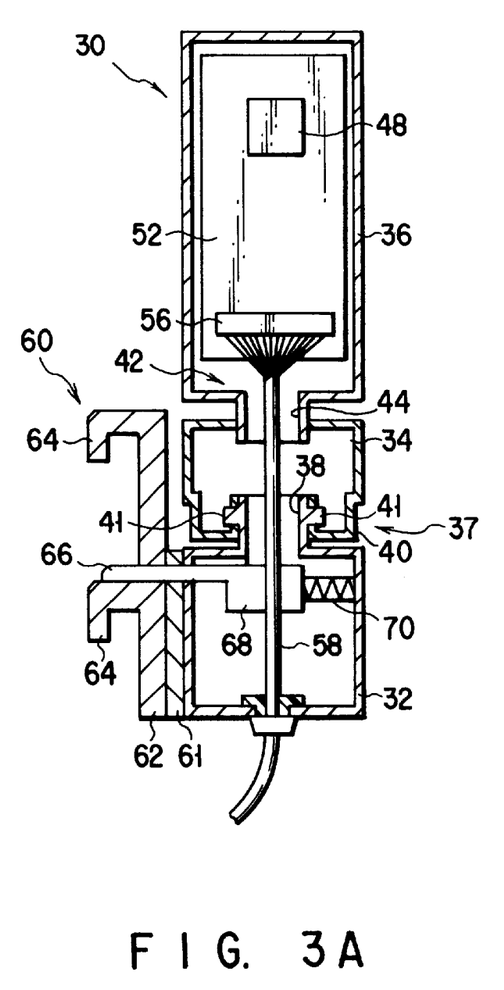
FIG. 3A is a sectional view taken along line IIIA—IIIA of FIG. 2A.
Figure 3B:
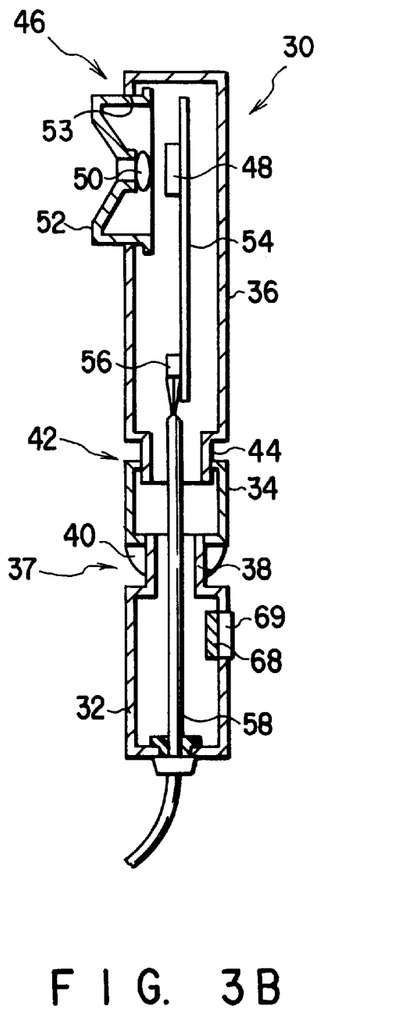
FIG. 3B is a sectional view taken along line IIIB—IIIB of FIG. 2A.

The first movable portion 34 is coupled to the base portion 32 by means of a tilting mechanism 37 that functions as a rotating mechanism, and is supported so as to be rotatable around a first rotation axis A with respect to the base portion 32. The tilting mechanism 37 includes a support portion 38, in the form of a square tube protruding from the top wall of the base portion 32, and a pair of leg portions 40 protruding from the bottom wall of the first movable portion 34 and situated on either side of the support portion 38. The leg portions 40 are fitted individually for rotation on a pair of pivots 41 that protrude from the support portion 38. The pivots 41 extend parallel to the top wall of the base portion 32 and defines the first rotation axis A.

The second movable portion 36 is coupled to the first movable portion 34 by means of a panning mechanism 42 that functions as another rotating mechanism, and is supported so as to be rotatable around a second rotation axis B with respect to the second movable portion 34. The panning mechanism 42 includes a cylindrical support portion 44, which protrudes from the bottom wall of the second portion 36 and is rotatably fitted in the top end wall of the first movable portion 34. The second rotation axis B is in alignment with the central axis of the support portion 44, and extends at right angles to the first rotation axis A.

The second movable portion 36 is provided with an image pickup portion 46 for detecting an image as directional information. The image pickup portion 46, which functions as information detecting means, includes a solid-state image pickup device (hereinafter referred to as CCD) 48 and a lens 50 for converging the image on a light receiving surface of the CCD. The lens 50 is fixed to a lens tube 52, which is rotatably fitted in a through hole 53 formed in the front wall of the second movable portion 36. Further, the CCD 48 is mounted on a printed circuit board 54 in the second movable portion 36, and faces the lens 50. The lens 50 can be focused by rotating the lens tube 52.

One end of a signal wire 58 is connected to the printed circuit board 54 by means of a connector 56. The wire 58 extends into the base portion 32 through the support portion 44, first movable portion 34, and support portion 38, which are all hollow, in the order named, and moreover, is led out of the camera 30 through the bottom wall of the base portion 32. A connector (not shown) is attached to the other end of the signal wire 58.

The camera 30 is provided with a mounting mechanism 60 for removably mounting the base portion 32 on the display unit 14 of the personal computer 10. As shown in FIGS. 2A to 4, the mechanism 60 includes an elongate mounting plate 62 fixed to a side face of the base portion 32 through a spacer 61. The plate 62 extends parallel to the central axis of the base portion 32, from the lower end of the base portion 32 to a position near the upper end of the first movable portion 34.

Figure 4:
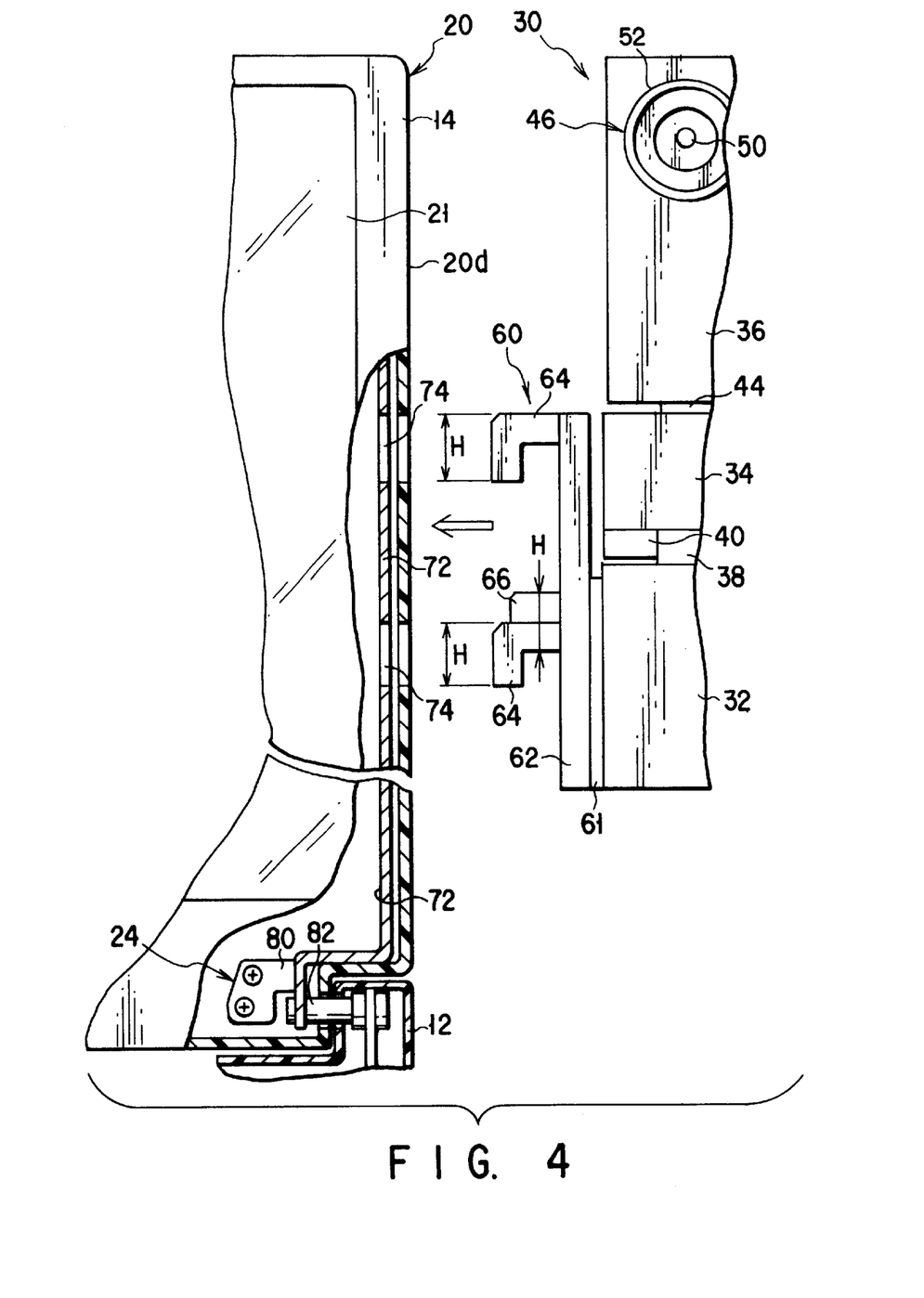
FIG. 4 is a view showing a mounting mechanism of the camera and a camera mounting portion of the personal computer.

The mounting plate 62 is formed having a pair of engaging claws 64, which project oppositely from the base portion 32 and the first movable portion 34. The claws 64 are arranged at a given distance from each other, in the longitudinal direction of the mounting plate 62, and are in the shape of a downward L each. The distal end portion of each claw 64 that extends in the longitudinal direction of the plate 62 has a height H.

A locking claw 66 is provided on the upper surface of the lower engaging claw 64 so as to be slidable in a direction parallel to the first rotation axis A. The claw 66 extends into the base portion 32 through the mounting plate 62, the spacer 61, and a side wall of the base portion 32. The proximal end portion of the locking claw 66 is formed integrally with an unlocking lever 68 in the base portion 32.

Figure 2A:
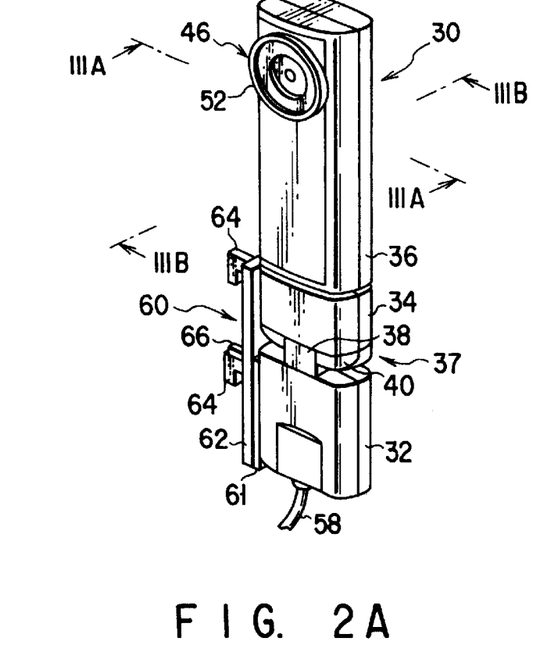
FIGS. 2A, 2B, 2C and 2D are a front-side perspective view, rear-side perspective view, front view, and side view, respectively, of the camera.
Figure 2B:
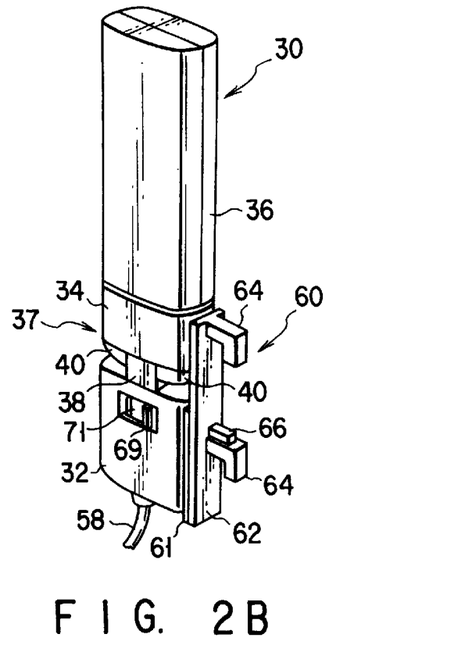
Figure 2C:
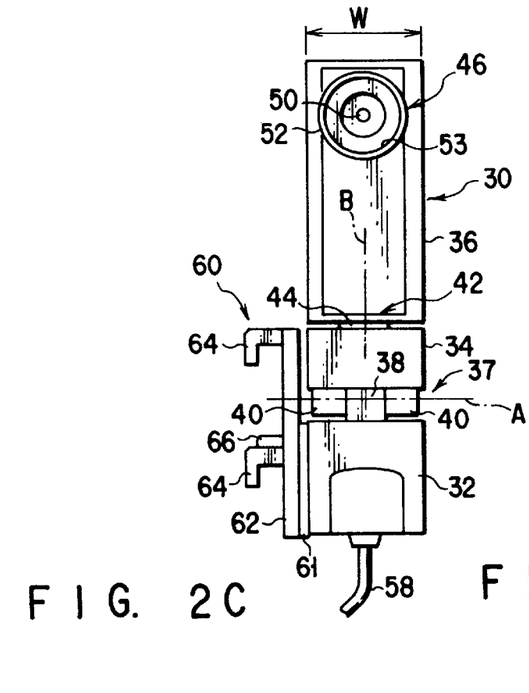
Figure 2D:
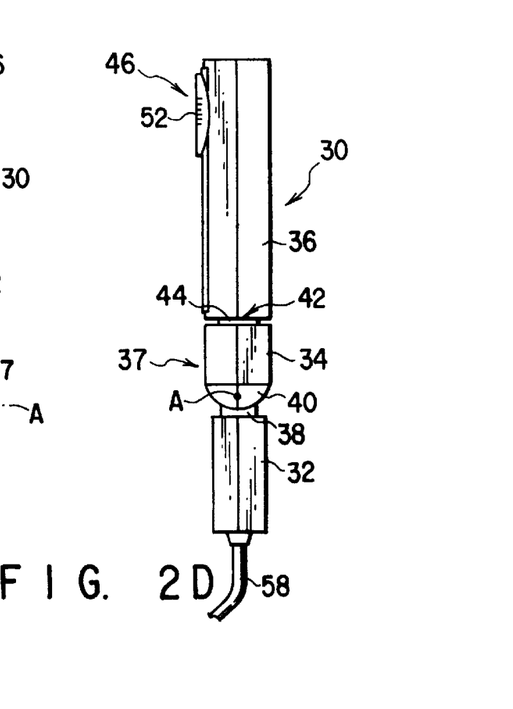

The locking claw 66 is urged to project from the mounting plate 62 by a compression spring 70 in the base portion 32. Normally, the claw 66 is held in a locking position shown in the drawings such that it projects on the upper surface of the lower engaging claw 64. When the locking claw 66 is on the lower engaging claw 64, the sum of the respective heights of the proximal end portion of the lower engaging claw and the locking claw is adjusted to H. As shown in FIGS. 2B and 3B, the unlocking lever 68 integrally has a control knob 69, which can be externally operated through an aperture 71 in the rear wall of the base portion 32.

As shown in FIG. 4, on the other hand, the display unit 14, which is fitted with the camera 30, has a metallic frame 72 that is located along the side walls 20c 20d in the display housing 20. A bracket 80 is provided integrally on the lower end portion of the frame 72. It is screwed to the inner surface of the housing 20. The bracket 80 engages a hinge shaft 82 that protrudes from the apparatus body 12, thus constituting the hinge portion 24.

A pair of engaging holes 74 are formed in the side wall 20d of the display housing 20 and the metallic frame 72 that adjoins and faces the wall 20d. The engaging claws 64 of the camera 30 are expected to engage the holes 74, individually. Each engaging hole 74 has substantially the same height H as the distal end portion of each engaging claw 64 and substantially the same width as each engaging claw.

Figure 5:
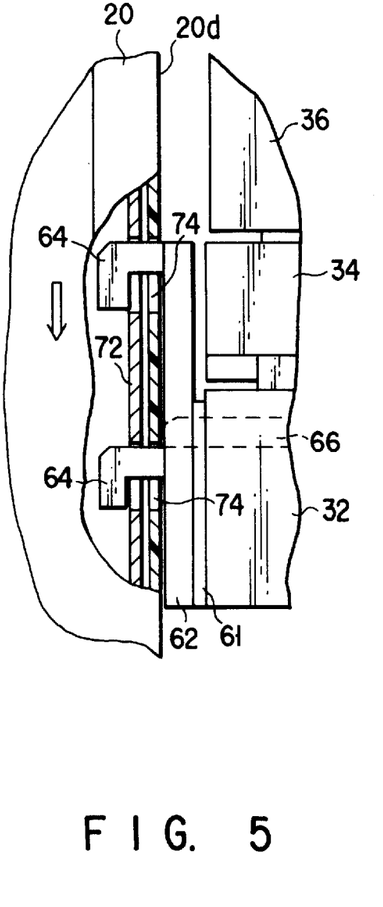
FIG. 5 is a view showing the way the camera with the mounting mechanism is mounted on the camera mounting portion of the personal computer.

In attaching the camera 30 to the side wall 20d of the display unit 14, the engaging claws 64 of the mounting mechanism 60 are first opposed to their corresponding engaging holes 74, as shown in FIG. 4, and are then inserted individually into the holes 74 in a direction perpendicular to the side wall 20d. When the engaging claws 64 are inserted so that the mounting plate 62 abuts against the side wall 20d, as shown in FIG. 5, the locking claw 66 abuts against the side wall 20d and is pressed toward the base portion 32, resisting the urging force of the compression spring 70.

Figure 6:
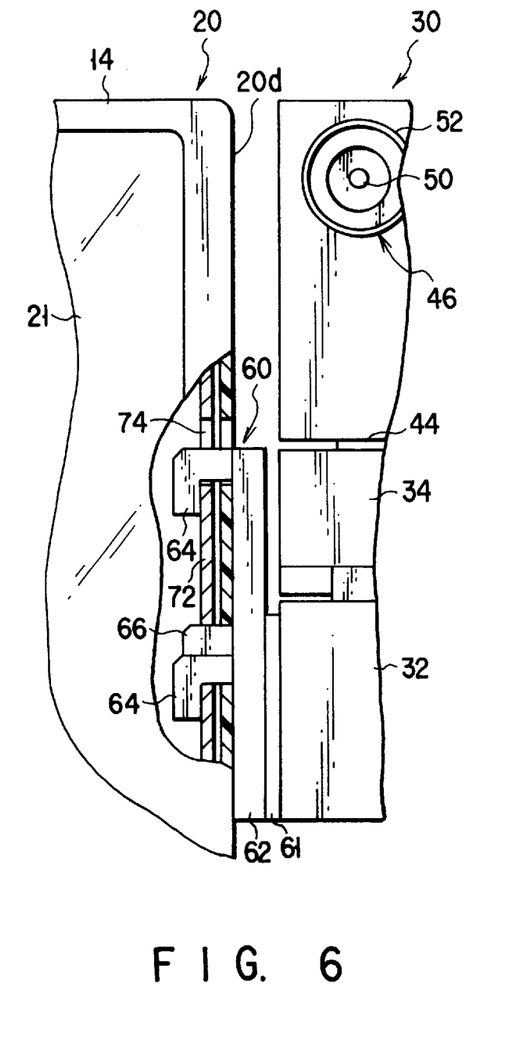
FIG. 6 is a view showing the camera with the mounting mechanism mounted on the camera mounting portion of the personal computer.

Subsequently, the whole camera 30 is pushed down. Thereupon, the respective distal end portions of the engaging claws 64 engage the metallic frame 72, as shown in FIG. 6, whereby the mounting plate 62 and the base portion 32 are attached to the side wall 20d of the display unit 14. At the same time, the locking claw 66 is disengaged from the side wall 20d and faces its corresponding engaging hole 74, so that it is urged by the compression spring 70 to project into the locking position, and is inserted into the lower engaging hole 74. Since the sum of the respective heights of the proximal end portion of the lower engaging claw 64 and the locking claw 66 is substantially equal to the height H of the engaging hole 74, the mounting plate 62 is restrained from moving upward, and is locked in the attached state.

The camera 30 is attached to the display unit 14 and locked automatically by the operation described above. On the other hand, the signal wire 58 extending from the camera 30 is connected to a connector on the rear face of the body of the personal computer 10 by means of the aforesaid connector (not shown).

In removing the camera 30 from the display unit 14, the unlocking lever 68 and the locking claw 66 are slid to a release position by means of the control knob 69 on the rear side of the base portion 32, and the locking claw 66 is drawn out of the lower engaging hole 74 of the display unit 14. Thereupon, the mounting plate 62 is unlocked. Thereafter, the camera 30 is removed from the display unit 14 by reversely carrying out the mounting operation.

Figure 7A:
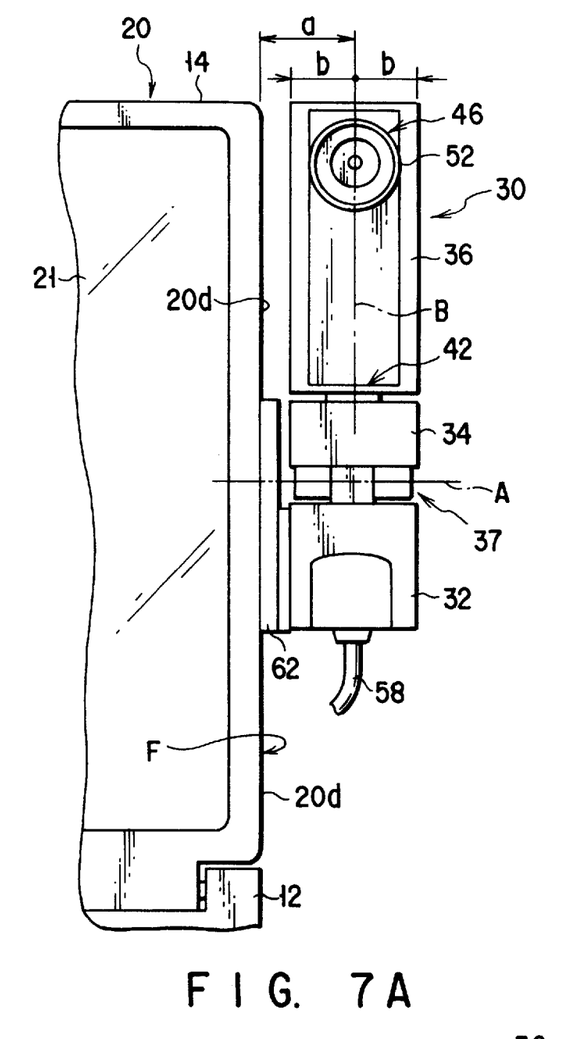
FIGS. 7A, 7B and 7C are a front view, side view, and plan view, respectively, showing the camera mounted on the personal computer.

When the camera 30 is mounted on the side wall 20d of the display unit 14, as shown in FIG. 7A, its first rotation axis A extends at right angles to an imaginary reference plane F (coincident with the outer surface of the side wall 20d of the display unit according to the present embodiment) that is in contact with the outer surface of the display unit, while its second rotation axis B extends parallel to the reference plane F.

If the distance between the second rotation axis B and the imaginary reference plane F is a and the distance between the axis B and the outermost portion of the outer surface of the second movable portion 36 with respect to the axis B is b (=W/2), the camera 30 is formed so that there is a relation a>b when it is mounted on the display unit 14.

Figure 7B:
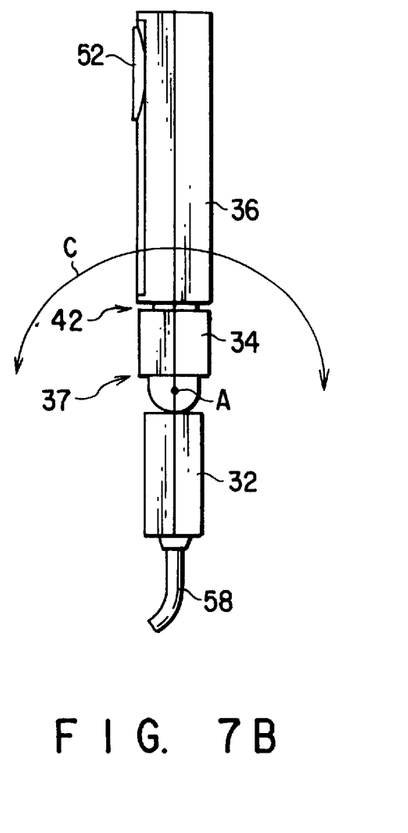

In focusing the image pickup portion 46 of the camera 30 on a subject, e.g., an operator of the personal computer 10, tilt adjustment is made in a manner such that the image pickup portion 46 is moved back or forth by rocking the first movable portion 34 around the first rotation axis A, as indicated by arrow C in FIG. 7B. Also, pan adjustment is made in a manner such that the image pickup portion 46 is rotated horizontally by rotating the second movable portion 36 around the second rotation axis B, as indicated by arrow D in FIG. 7C.

Figure 7C:
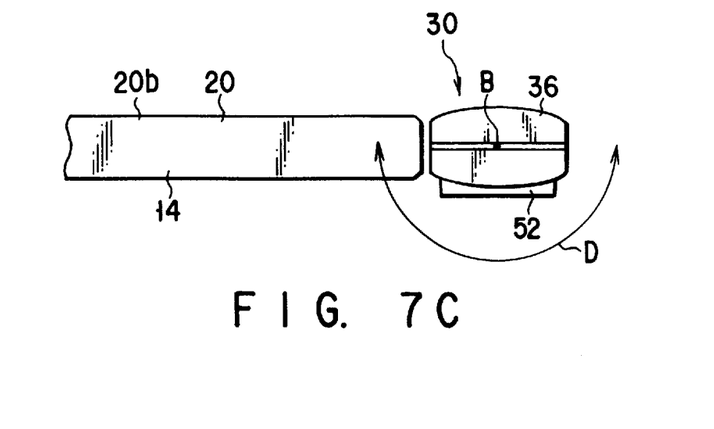

In this case, the first movable portion 34, which is supported on the base portion 32, rotates around the first rotation axis A that extends perpendicular to the imaginary reference plane F, so that the second rotation axis B is kept parallel to the plane F without regard to the result of the tilt adjustment. The second movable portion 36, which rotates around the second rotation axis B that extends parallel to the plane F, is formed and mounted so as to maintain the relation a>b. Without regard to the results of the tilt and pan adjustments, therefore, the second movable portion 36 never interferes with the imaginary reference plane F, that is, it cannot run against the display unit 14. Moreover, there is no possibility of the second movable portion 36 projecting beyond the plane F to any region in front of the display unit 14.

According to the camera 30 constructed in this manner, therefore, the tilt and pan adjustments can be carried out over a wide range without taking account of interference with the display unit 14, and the image pickup portion 46 can be directed accurately toward the subject. Accordingly, an image of the subject can be satisfactorily picked up by means of the camera 30 and applied to the input of the personal computer 10.

Thus, there may be provided an information detecting apparatus that ensures wide-range angle adjustment and accurate detection of directional information, and can be securely prevented from interfering with an information processing apparatus, and an information processing system provided with the same.

Since the camera 30 never interferes with the display unit 14, moreover, they can be prevented from being damaged by careless operation. Furthermore, there is no possibility of the camera 30 projecting to any region in front of the display unit 14 and hindering the display, so that good operating conditions can be ensured.

It is to be understood that the present invention is not limited to the embodiment described above, and that various changes and modifications may be effected therein by one skilled in the art without departing from the scope or spirit of the invention. For example, the camera 30 may be attached to any other side wall 20b or 20c of the display unit 14 than the side wall 20d.

The information detecting apparatus is not limited to a camera for detecting images, and may alternatively be arranged as an apparatus that receives and transmits directional information, such as an infrared transmitter-receiver adapted to transmit and receive infrared signals, a transmitter-receiver adapted to transmit and receive radio waves, etc. In this case, the second movable portion 36 is fitted with an infrared transmitting-receiving portion, antenna portion, etc. in place of the image pickup portion according to the foregoing embodiment.

Moreover, the information processing apparatus may be applied to a desktop personal computer, word processor, etc. as well as to a portable personal computer.

The shapes and sizes of the base portion and the first and second movable portions may be changed variously as long as the conditions described in connection with the foregoing embodiment are satisfied. The mounting means for mounting the base portion on the information processing apparatus may be selected as required among various measures including screwing, clamping, adhesive bonding, etc.

According to the embodiment described herein, the outer surface of the information processing apparatus on which the information detecting apparatus is mounted is a flat surface that coincides with an imaginary reference plane. Alternatively, however, the information detecting apparatus of the present invention may be mounted on a curved surface. In this case, the detecting apparatus is formed having a given size and is situated in a predetermined position with respect to an imaginary reference plane in contact with the curved surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An information processing system comprising:

an information processing apparatus including an apparatus body provided with input means for inputting data and a substantially rectangular display unit rotatably supported on the apparatus body; and a camera removably attached to the information processing apparatus;

the display unit of the information processing apparatus including a side wall, a metallic member provided along the inner surface of the side wall, and a camera mounting portion provided at the side wall and the metallic member, the camera including a base portion, a first movable portion attached to the base portion so as to be rotatable around a first rotation axis, a second movable portion attached to the first movable portion so as to be rotatable around a second rotation axis perpendicular to the first rotation axis, an image pickup portion provided on the second movable portion, for picking up and delivering an image of a subject to the information processing apparatus, and mounting means provided on the base portion, for mounting the base portion on the display unit in a manner such that the first and second rotation axes extend at right angles and substantially parallel, respectively, to the side wall of the display unit, and wherein the camera mounting portion includes an engaging hole formed in the side wall and the metallic member, and the mounting means includes a mounting plate fixed to the base portion and extending perpendicular to the first rotation axis and an engaging claw protruding from the mounting plate, for engaging the engaging hole of the display unit.

2. An information processing system according to claim 1, wherein the mounting means includes locking means for locking the engaging claw in engagement with the engaging hole.

3. An information processing system comprising:

an information processing apparatus including an apparatus body provided with input means for inputting data, a substantially rectangular display unit rotatably supported on the apparatus body, and a hinge portion for swingably supporting the display unit on the apparatus body; and a camera removably attached to the information processing apparatus;

the display unit of the information processing apparatus including a side wall, a metallic member provided along the inner surface of the side wall and provided integrally with a hinge bracket constituting a part of the hinge portion, and a camera mounting portion provided at the side wall and the metallic member, the camera including a base portion, a first movable portion attached to the base portion so as to be rotatable around a first rotation axis, a second movable portion attached to the first movable portion so as to be rotatable around a second rotation axis perpendicular to the first rotation axis, an image pickup portion provided on the second movable portion, for picking up and delivering an image of a subject to the information processing apparatus, and mounting means provided on the base portion, for mounting the base portion on the display unit in a manner such that the first and second rotation axes extend at right angles and substantially parallel, respectively, to the side wall of the display unit.

4. An information processing system comprising:

an information processing apparatus including input means for inputting data, a side wall, and a camera mounting portion provided at the side wall; and a camera removably attached to the camera mounting portion of the information processing apparatus;

the camera including a base portion, a movable portion rotatably attached to the base portion, an image pickup portion provided on the movable portion, for picking up and delivering an image of a subject to the information processing apparatus, and mounting means provided on the base portion, for mounting the base portion on the camera mounting portion of the information processing apparatus, and wherein the camera mounting portion includes an engaging hole formed in the side wall, and the mounting means includes a mounting plate fixed to the base portion and an engaging claw protruding from the mounting plate, for engaging the engaging hole of the camera mounting portion.

5. An information processing system according to claim 4, wherein the mounting means includes locking means for locking the engaging claw in engagement with the engaging hole.

6. An information processing system according to claim 4, wherein the information processing apparatus includes a metallic member provided along an inner surface of the side wall, the camera mounting portion is provided at the side wall and the metallic member, and the engaging hole is formed in the side wall and the metallic member.

* * * * *